United States Patent
Pan et al.

(10) Patent No.: US 10,185,729 B2
(45) Date of Patent: Jan. 22, 2019

(54) INDEX CREATION METHOD AND SYSTEM

(71) Applicant: SHENZHEN SHI JI GUANG SU INFORMATION TECHNOLOGY CO, Shenzhen (CN)

(72) Inventors: Shushen Pan, Shenzhen (CN); Jiaqiang Wang, Shenzhen (CN)

(73) Assignee: SHENZHEN SHI JI GUANG SU INFORMATION TECHNOLOGY CO., LTD., Shenzhen (CN)

( * ) Notice: Subject to any disclaimer, the term of this patent is extended or adjusted under 35 U.S.C. 154(b) by 181 days.

(21) Appl. No.: 14/133,841

(22) Filed: Dec. 19, 2013

(65) Prior Publication Data
US 2014/0108420 A1    Apr. 17, 2014

Related U.S. Application Data

(63) Continuation of application No. PCT/CN2012/078932, filed on Jul. 20, 2012.

(30) Foreign Application Priority Data

Oct. 14, 2011   (CN) .......................... 2011 1 0311264

(51) Int. Cl.
*G06F 17/30*     (2006.01)

(52) U.S. Cl.
CPC .. *G06F 17/30321* (2013.01); *G06F 17/30545* (2013.01); *G06F 17/30551* (2013.01)

(58) Field of Classification Search
CPC .............................................. G06F 17/30321
See application file for complete search history.

(56) References Cited

U.S. PATENT DOCUMENTS

| | | | | |
|---|---|---|---|---|
| 7,509,315 B1* | 3/2009 | Alpert | ............... | G06F 17/30864 707/5 |
| 8,566,546 B1* | 10/2013 | Marshak | ............... | G06F 3/0604 711/112 |

(Continued)

FOREIGN PATENT DOCUMENTS

CN          101216821 A        7/2008

OTHER PUBLICATIONS

Lin et al., "Incremental Update on Sequential Patterns in Large Database by Implicit Merging and Efficient Counting", 2003.*

(Continued)

*Primary Examiner* — Neveen Abel Jalil
*Assistant Examiner* — Dawaune A Conyers
(74) *Attorney, Agent, or Firm* — Anova Law Group, PLLC

(57) ABSTRACT

A data searching system is provided for real-time database searching. The data searching system includes a plurality of databases having respective maximum data capacity, and a searching module configured to provide a searching service interface. The data searching system also includes an index module configured to write received data into one of the plurality of databases, to treat the received data as the most up-to-date data to be stored over data having a longer existence time period in the plurality of database when the plurality of databases are filled; and to create indices of the plurality of databases. Further, the data searching system includes a transmission module configured to send the created indices of the plurality of databases to the searching module to provide searching results of the data searching system.

12 Claims, 3 Drawing Sheets

(56) References Cited

U.S. PATENT DOCUMENTS

| | | | |
|---|---|---|---|
| 2008/0215546 A1* | 9/2008 | Baum | G06F 17/30342 707/3 |
| 2011/0022966 A1* | 1/2011 | Rose | G06F 17/3089 715/747 |
| 2011/0196855 A1* | 8/2011 | Wable | G06F 17/30631 707/711 |
| 2012/0166404 A1* | 6/2012 | Palakodety | G06F 17/30622 707/693 |
| 2012/0197934 A1* | 8/2012 | Zhang | G06F 17/30516 707/770 |

OTHER PUBLICATIONS

The World Intellectual Property Organization (WIPO) International Search Report for PCT/CN2012/078932 dated Oct. 25, 2012 3 Pages.

* cited by examiner

INDEX CREATION METHOD AND SYSTEM

CROSS-REFERENCES TO RELATED APPLICATIONS

This application is a continuation of PCT Patent Application No. PCT/CN2012/078932, filed on Jul. 20, 2012, which claims the priority of Chinese patent application no. 201110311264.5, filed on Oct. 14, 2011, the entire contents of all of which are incorporated herein by reference.

FIELD OF THE INVENTION

The present invention generally relates to the field of Internet data processing technology and, more particularly, to database indexing systems and methods.

BACKGROUND

Currently, Internet searching engines are mainly based on traditional search engines from companies such as Baidu and Google. These search engines, by crawling through the pages on the Internet and performing analysis on obtained data, create index or indices for the obtained data periodically.

With respect to the real-time aspect of the obtain data, however, these search engines can only achieve data updating in term of the minute. But for emerging Internet applications, such as microblogging (Weibo), the data updating rate is very high. For example, when a top news event happens, there may be hundreds and thousands of news stories every second, and these traditional search engines may be unable to handle such real-time news updating. Faster real-time data searching techniques may be needed to supplement operation of the traditional search engines.

The disclosed methods and systems are directed to solve one or more problems set forth above and other problems.

BRIEF SUMMARY OF THE DISCLOSURE

One aspect of the present disclosure includes a data searching system. The data searching system includes a plurality of databases having respective maximum data capacity, and a searching module configured to provide a searching service interface. The data searching system also includes an index module configured to write received data into one of the plurality of databases, to treat the received data as the most up-to-date data to be stored over data having a longer existence time period in the plurality of database when the plurality of databases are filled; and to create indices of the plurality of databases. Further, the data searching system includes a transmission module configured to send the created indices of the plurality of databases to the searching module to provide searching results of the data searching system.

Another aspect of the present disclosure includes a method for a data searching system to create index. The method includes creating a plurality of databases having respective maximum data capacity, receiving data related to a searching operation, and writing the received data into one of the plurality of databases. The method also includes storing the received data as the most up-to-date data over data having a longer existence time period in the plurality of database when the plurality of databases are filled. Further, the method includes creating indices of the plurality of databases, and sending the created indices of the plurality of databases to a searching service interface for providing searching results of the data searching system.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 6:
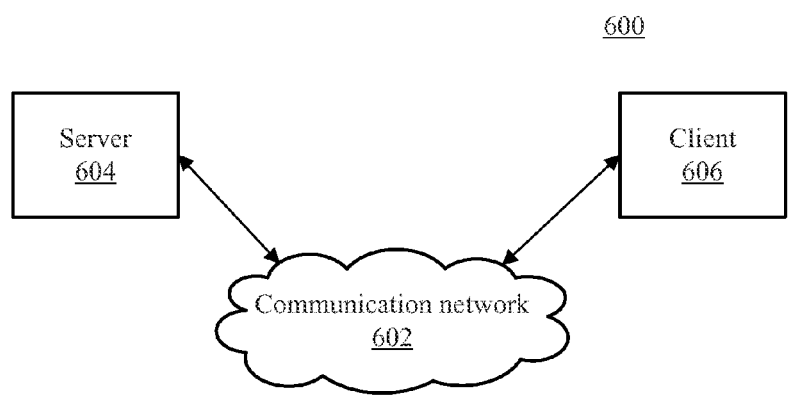
FIG. 6 illustrates an exemplary environment incorporating certain disclosed embodiments.

FIG. 6 illustrates an exemplary environment 600 incorporating certain disclosed embodiments of the present invention. As shown in FIG. 6, environment 600 may include a server 604, a client 606, and a communication network 602. The server 604 and the client 606 may be coupled through the communication network 602 for information exchange, such as Internet searching. Although only one client 606 and one server 604 is shown in the environment 600, any number of clients 606 or servers 604 may be included, and other devices may also be included.

Communication network 602 may include any appropriate type of communication network for providing network connections to the server 604 and client 606 or among multiple servers 604 or clients 606. For example, communication network 602 may include the Internet or other types of computer networks or telecommunication networks, either wired or wireless.

A client, as used herein, may refer to any appropriate user terminal with certain computing capabilities, such as a personal computer (PC), a work station computer, a server computer, a hand-held computing device (tablet), a smart phone or mobile phone, or any other user-side computing device.

Figure 7:
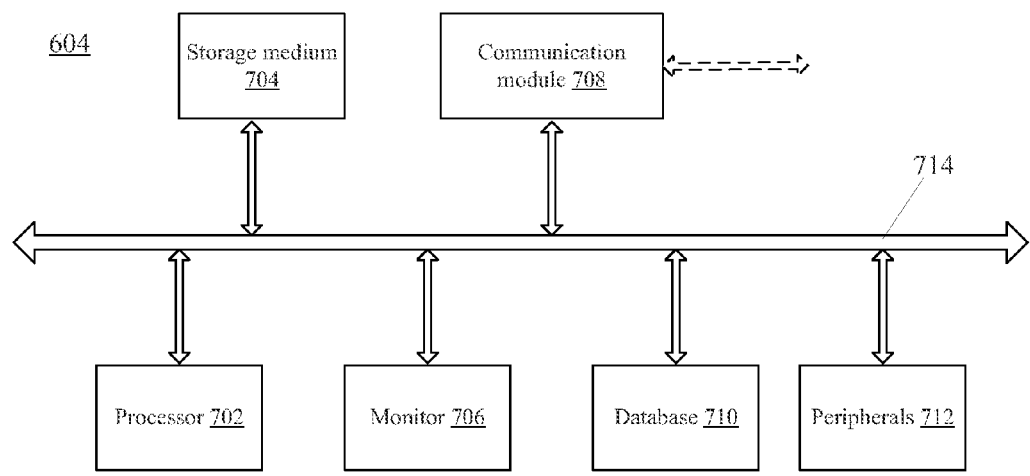
FIG. 7 illustrates an exemplary server consistent with the disclosed embodiments.

A server, as used herein, may refer one or more server computers configured to provide certain server functionalities, such as database management and search engines. A server may also include one or more processors to execute computer programs in parallel. FIG. 7 shows a block diagram of an exemplary server 604.

As shown in FIG. 7, server 604 may include a processor 702, a storage medium 704, a monitor 706, a communication module 708, a database 710, peripherals 712, and one or more bus 714 to couple the devices together. Certain devices may be omitted and other devices may be included.

Processor 702 may include any appropriate processor or processors. Further, processor 702 can include multiple cores for multi-thread or parallel processing. Storage medium 704 may include modules, such as ROM, RAM, and flash memory modules, and mass storages, such as CD-ROM, U-disk, removable hard disk, etc. Storage medium 704 may store computer programs for implementing various processes, when executed by processor 702.

Further, peripherals 712 may include I/O devices such as keyboard and mouse, and communication module 708 may include network devices for establishing connections through the communication network 602. Database 710 may include one or more databases for storing certain data and for performing certain operations on the stored data, such as database searching.

Figure 1:
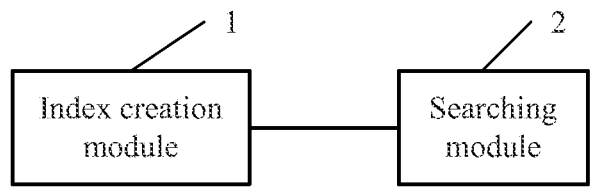
FIG. 1 illustrates an exemplary data searching system consistent with the disclosed embodiments.

In operation, client 606 may cause server 604 to perform certain actions, such as an Internet search or other database operations. Server 604 may be configured to provide structures and functions for such actions and operations. More particularly, server 604 may include a data searching system for real-time database searching. The real-time database searching functionality may be realized by separating a server database into a plurality of databases each having a fixed upper limit on the database capacity, i.e., maximum capacity. Thus, instead of creating indices for a single large database, which may be a large number, indices of the plurality of smaller databases can be created with substantially less amount of time. FIG. 1 illustrates an exemplary data searching system consistent with the disclosed embodiments.

As shown in FIG. 1, the data searching system (e.g., a search engine) includes an index creation module 1 and searching module 2. Index creation module 1 may include certain computer hardware and software of server 604 to create database indices for the plurality of databases, and searching module 2 may include certain computer hardware and software to provide searching functions based on the database indices created by index creation module 1. For example, searching module 2 may provide a searching interface for users or other computer programs to use the data searching system, e.g., receiving searching instructions and providing searching results, etc.

Figure 2:
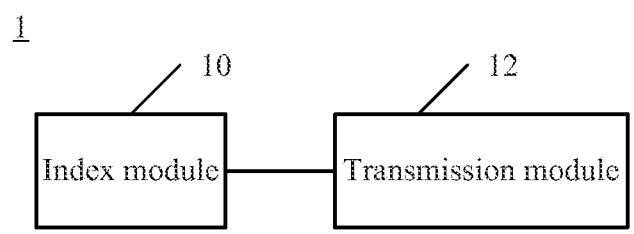
FIG. 2 illustrates an exemplary index creation module consistent with the disclosed embodiments.

Index creation module 1 and searching module 2 may be located at same server 604, may be distributed among different servers 604, or may be distributed among server(s) 604 and client(s) 606. For example, searching module 2 may be located on a server 604 or may be located on a client 606, while index creation module 1 may be located on a single server 604 or multiple servers 604. FIG. 2 illustrates an exemplary index creation module 1.

As shown in FIG. 2, index creation module 1 may include an index module 10 and a transmission module 12. Index module 10 is configured to receive data that need to be maintained for real-time searching, to write the received data into the plurality of databases in real-time, i.e., selectively write the real-time data into one of the plurality of databases at a time, and to create indices for the plurality of databases. For illustrative purposes, the number of the plurality of databases may be represented by 'N', an integer greater than 1. Under certain circumstances, 'N' can also equal to 1.

Further, transmission module 12 is configured to transmit the created indices of the N databases to the searching module 2 of the data searching system, such that the searching module 2 can provide real-time data searching services to other programs or systems, such as client 606. The real-time data may include any appropriate network and/or user data, such as twitter or Weibo data.

Because the N databases have fixed upper limit on database capacity, when the N databases are full or filled, data with longer existence time period may be overwritten with the newly received data. Index module 10 may detect any change to the data in one or more databases, and may create new indices or update the existing indices of the N databases after data change is detected. For example, index module 10 may create new indices for the database with data changes. Transmission module 12 may then transmit the updated or newly created indices to the searching module 2. Searching module 2 may present the searching results to a user or other software program on client 606.

Further, various methods may be used to define the upper limit of the data capacity or maximum data capacity of the N databases. For example, the maximum data capacity for the N databases may be defined uniformly as having the same value. Or the maximum data capacity of individual databases of the N databases may be different from one another depending upon particular applications. For example, if Twitter, Weibo (a micro blog service), or other interact files are stored into an individual database, the individual database may have a maximum capacity set as a certain number of Twitter, Weibo articles, or other Internet files.

In addition, a desired value of N may also be predetermined for real-time data searching operations. If the value of N is defined as substantially less than the desired value of N, the total data capacity of the N database may be too small while the data capacity of individual databases may be too large. On the other hand, if the value of N is defined as substantially larger than the desired value of N, the number of indices created may be too large and undesirable for real-time searching. In certain embodiments, the desired value of N may be defined or determined based on particular applications and/or configurations of server 604, such as the number of processors, the number of processor cores in the processor, memory, and/or database size, etc. Further, the maximum data capacity of individual databases of the N databases may be configured in a way such that the indices of the individual database can be created within one second or so, and the value of N may be configured in a way such that a searching operation of the N databases may be completed in a matter of second(s) or so.

Figure 3:
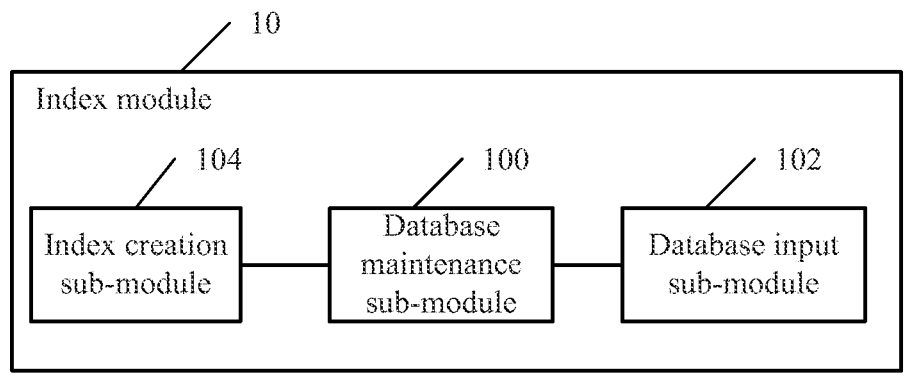
FIG. 3 illustrates an exemplary index module consistent with the disclosed embodiments.

As described above, index module 10 may write new data into the N databases and may overwrite old data with new data. FIG. 3 illustrates an exemplary index module 10 configured to handle operations on new data as well as old data in the N databases.

As shown in FIG. 3, the index module 10 may include a database maintenance sub-module 100, a database input sub-module 102, and an index creation sub-module 104. The database maintenance sub-module 100 is configured to maintain the N databases, such as detecting data changes and communicate with transmission module 12. The index creation sub-module 104 is configured to create indices based on data in the N databases.

The database input sub-module 102 may be configured to write data into the N databases using a specified algorithm, such as a circular writing algorithm. For example, when the database input sub-module 102 writes data into an n-th database in real-time ('n' is a number greater than or equal to 1 but less than or equal to N), if the n-th database is full and n+1<=N, the database input sub-module 102 writes the data into the (n+1)-th database. On the other hand, if the n-th database is full and n+1>N, the database input sub-module 102 writes the data into the first database and over certain original data in the first database (e.g., previously stored data having a longer existing time period).

For example, when N=1, n starts from 1, and the data is written to the first database. When the database is filled, and 1+1>1 (i.e., n+1>N), the new data is again written to the first database, overwriting the original data. While N=3, n starts from 1, and the new data is written to the first database. When the first database is filled, and 1+1<3 (i.e., n+1<N), the new data is written to the (1+1)-th (i.e., 2nd) database, and n is updated to n+1=2. Further, when the second database is filled, and 2+1=3 (i.e., n+1<=N), the new data is written to the (2+1)-th (i.e., 3rd) database, and n is updated to n+1=3. Finally, when the 3rd database is filled, and 3+1>3 (i.e., n+1>N), n is updated to 1, and the new data is written to the first database and the original data in the first database is overwritten.

In addition to the above sequential circular database updating scheme, other database updating schemes may also be used. For example, another circular database updating scheme may write data to odd number databases first then to even number databases in similar sequential fashion. Or the new data may be written into any of unfilled databases randomly.

Further, when overwriting the original data, the database to be overwritten may be chosen randomly among filled databases. Or the database to be overwritten may be chosen based on respective priorities of individual databases. The priority of a database for overwriting may be determined based on characteristics of individual databases. That is, each of the N databases may have a priority to be overwritten based on the characteristics or configurations of each database. For example, if a database uses high-speed hardware storage for fast data read/write access, the priority for such database may be set to high, and such database may have priority for being written or overwritten with the new data.

In addition, the original data to be overwritten may also be determined before the actual overwriting occurs. For example, the oldest (longest life) data may be overwritten first. Or the different original data may be set to different priorities based on importance of the original data. If an original data entry has a higher priority (i.e., high importance), the data entry may be kept longer than a data entry with a lower priority. For example, when a Twitter, Weibo or other internet document is shared or forwarded at a higher frequency than a normal document, such document with higher shared frequency may be set to a higher priority and can be kept longer. After such document is written into a particular database, the other original data with lower priority may be overwritten first before such document is overwritten by new data.

Figure 4:
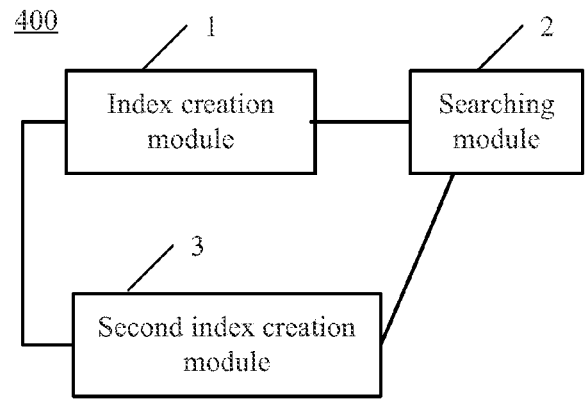
FIG. 4 illustrates another exemplary data searching system consistent with the disclosed embodiments.

In certain embodiments, it may be desired to keep the overwritten data when performing real-time data searching, such that the overwritten data can also be searched to supplement the real-time data searching. FIG. 4 illustrates an exemplary data searching system 400.

As shown in FIG. 4, data searching system 400 includes index creation module 1, searching module 2, and a second index creation module 3. As described above, the index creation module 1 and searching module 2 are configured to perform real-time data searching operations. The second index creation module 3 may be configured to create index for non-real-time data. That is, the second index creation module 3 may be configured for regular database searching. Thus, data searching system 400 may be formed by coupling two searching systems, one real-time data searching system (e.g., the index creation module 1 and searching module 2) and one regular or non-real-time data searching system (e.g., second index creation module 3 and searching module 2).

In operation, the real-time data searching system contains the N databases for real-time data searching, and the index creation module 1 creates indices for the N databases; while the regular data searching system contains a regular database for regular searching, and the second index creation module 3 creates indices for the regular database and also maintains the regular database. The searching module 3 is coupled to both the index creation module 1 and the second index creation module 3 to provide searching functions for both the N databases and the regular database.

When the N databases are filled, before any original data in the N databases is overwritten by the new data, the original data to be overwritten is first moved to the regular database. When searching module 2 receives a searching request, searching module 2 may cause the N databases being searched first fir real-time data using the index creation module 1, and may further cause the regular database being searched using the second index creation module 3 if the real-time data searching does not have results or does not have desired results. Thus, a complete database searching may be performed based on data in both the N databases and the regular database to supplement the real-time data searching. Under certain circumstances, the real-time data searching can also be used to supplement the regular data searching.

Alternatively, the searching module 2 may cause the N databases and the regular database being searched at the same time. The results of the searching may be presented to users (e.g., client 606) through the searching module 2. Thus, in the data searching system 400, new data is written into one of the N databases, while older data or staled data is moved to the regular database. The new data can then be searched in real-time, while the older data can also be searched.

Figure 5:
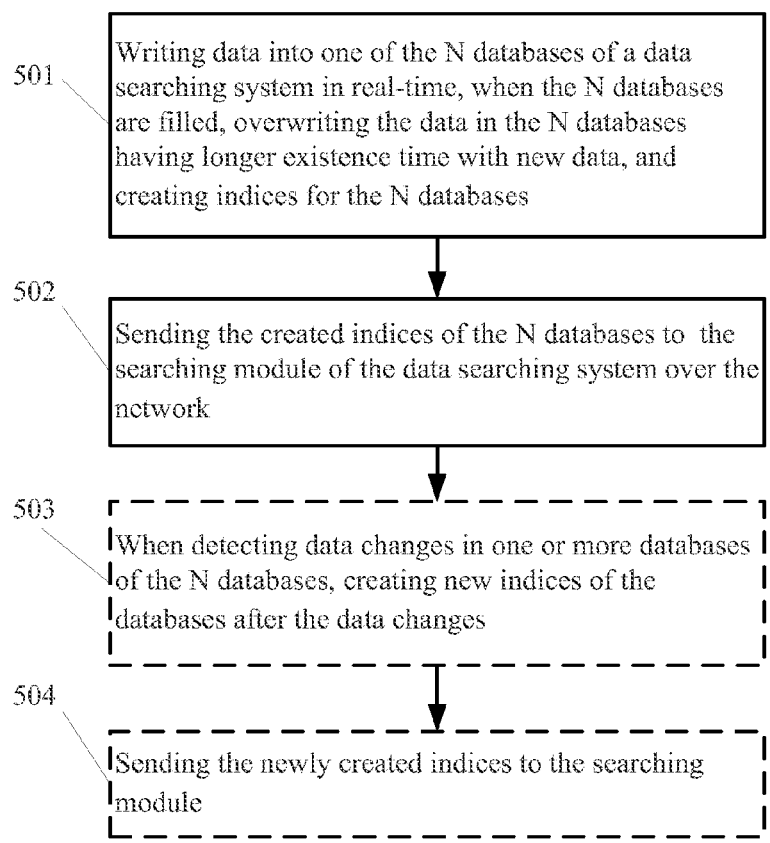
FIG. 5 illustrates an exemplary index creation process consistent with the disclosed embodiments.

FIG. 5 illustrates an exemplary index creation process in a data searching system consistent with the disclosed embodiments. As shown in FIG. 5, when the data searching system receives new data, the data searching system writes the new data into one of the N database in real-time and creates indices for the N databases (501). When the N databases are filled, the received data is written into one of the N databases by overwriting certain original data in the N databases having longer (or longest) existence time. Under certain circumstances, data with longer existence time may be considered as non-real-time data.

A circular writing algorithm may be used to write received data into the N databases. That is, the received data is written into an n-th database in real time and, when the n-th database is filled and n+1<=N, the received data is written to the (n+1)-th database. On the other hand, when the n-th database is filled and n+1>N, the received data is written to the first database, overwriting the original data in the first database.

The created indices of the N databases are sent to the searching module of the data searching system over the network using the transmission module 12 (502). Further, optionally, when the data searching system detects data changes in one or more databases of the N databases, new indices of the databases after the data changes are created or updated (503). And the newly created indices is sent to the searching module again (504). Other steps or actions may also be performed in this index creation process as shown in FIG. 5.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art.

The disclosed methods and systems can be used to implement real-time data searching and may be used in a variety of internet applications, such as search engines, social networks, and other data-related applications.

By using the disclosed methods and structures, real-time database searching can be achieved without substantial additional resources. The real-time database searching can support data updating within seconds and greatly improve the user experience when performing Internet searching. Further, the disclosed methods and structures can also support a parallel configuration of real-time data searching and regular or non-real-time data searching, such that one searching can supplement the other to support fast yet complete data searching.

What is claimed is:

1. A data searching system that accelerates real-time data searching, comprising:
   a plurality of databases having storage medium with respective maximum data capacity;
   one or more processors;
   memory; and
   one or more program modules stored in the memory and to be executed by the one or more processors, comprising:
      a searching module configured to provide a searching service interface;
      a first index module configured to, when receiving incoming data, write received data into one of the plurality of databases in real-time, to treat the received data as the most up-to-date data to be stored by overwriting original data having a longer existence time period in the plurality of database when the plurality of databases are full; and to create indices of the plurality of databases;
      a transmission module configured to send the created indices of the plurality of databases to the searching module to provide searching results of the data searching system, such that real-time data updating is completed within seconds and real-time database searching is achieved without substantial additional resources; and
      a second index creation module configured to maintain a regular database online and to create indices for the regular database, the regular database having a parallel configuration with the plurality of databases directed to real-time data searching,
   wherein the first index module further includes:
      a database maintenance sub-module configured to maintain the plurality of databases and assign respective priorities to each of the plurality of databases;
      a database input sub-module configured to write the received data into an unfilled database in real-time, and to write the received data into a prioritized database when the plurality of databases are filled, overwriting the data having a longer existence time period in the prioritized database, wherein the prioritized database is chosen based on the assigned priority; and
      an index creation sub-module for generating indices of the plurality of databases;
   wherein, provided that N represents a total number of the plurality of databases and n represents a database number, the first index module is further configured to implement a sequential circular database updating scheme for choosing one database from the plurality of databases to store the received data, including:
      when n-th database is not full, write the received data into the n-th database in real-time, wherein n is a positive integer;
      when the n-th database is full and n+1<=N, write the received data into (n+1)-th database, and update n to be equal to n+1, wherein N is an integer greater than 2; and
      when the n-th database is full and n+1>N, write the received data into first database, overwrite the original data having a longer existence time period in the first database, and update n to be equal to 1,
   wherein before any original data in the plurality of databases is overwritten by the received data, the to-be-overwritten original data is moved to the regular database; and
   the regular database provides search results supplementing the real-time data searching performed by the first index module for supporting fast and complete searching.

2. The data searching system according to claim 1, wherein:
   the first index module is further configured to detect data changes in one or more of the plurality of databases, and to create new indices of the database with the data changes; and
   the transmission module is further configured to send the indices to the searching module.

3. The data searching system according to claim 1, wherein:
   the received data includes data from a social media host; and
   the maximum data capacity includes an upper limit on a total number of articles.

4. The data searching system according to claim 1, wherein:
   the second index creation module is further configured to send the indices for the regular database to the searching module to provide regular searching services;
   when the searching module receives a searching request, the searching module causes the index creation module to search the plurality of databases for real-time data;
   when the real-time data searching does not have desired results, the searching module causes the second index creation module to search the regular database.

5. The data searching system according to claim 1, wherein:
   the maximum data capacity of an individual database from the plurality of databases is configured in such a way that the indices for the individual database are created in about one second by the data searching system.

6. The data searching system according to claim 1, wherein:
   the priorities of the plurality of databases are assigned based on hardware characteristics of each of the plurality of databases; and
   when a database uses high-speed hardware storage for fast data access, the priority of the database is set to high.

7. The data searching system according to claim 1, wherein:

N is determined based on a number of the one or more processors and sizes of the plurality of the databases.

8. The data searching system according to claim 1, wherein the overwriting the data having a longer existence time period in the prioritized database further comprises:
   determining importance levels of the data stored in the prioritized database based on sharing frequencies at social network websites, wherein when an internet document is shared at a higher frequency, the data associated with the internet document is set to a higher importance level; and
   overwriting the data having a longer existence time period and a lower importance level in the prioritized database.

9. A method for a data searching system to create index that accelerates real-time data searching, comprising:
   creating a plurality of databases having storage medium with respective maximum data capacity;
   receiving data related to a searching operation;
   writing the received data into one of the plurality of databases in real-time;
   storing the received data as the most up-to-date data by overwriting original data having a longer existence time period in the plurality of database when the plurality of databases are full;
   creating indices of the plurality of databases;
   sending the created indices of the plurality of databases to a searching service interface for providing searching results of the data searching system, such that real-time data updating is completed within seconds and real-time database searching is achieved without substantial additional resources;
   maintaining a regular database online, the regular database having a parallel configuration with the plurality of databases directed to real-time data searching;
   before any original data in the plurality of databases is overwritten by the received data, moving the to-be-overwritten original data to the regular database; and
   creating indices for the regular database,
   wherein the regular database provides search results supplementing the real-time data searching performed by the plurality of databases for supporting fast and complete searching,
   wherein the storing the received data as the most up-to-date data over data having a longer existence time period in the plurality of database further includes:
      maintaining the plurality of databases and assigning respective priorities to each of the plurality of databases;
      writing the received data into an unfilled database in real-time;
      writing the received data into a prioritized database when the plurality of databases are filled, overwriting the data having a longer existence time period in the prioritized database, wherein the prioritized database is chosen based on the assigned priority; and
      generating indices of the plurality of databases; and
   wherein, provided that N represents a total number of the plurality of databases and n represents a database number, the storing the received data as the most up-to-date data over data having a longer existence time period in the plurality of database further includes implementing a sequential circular database updating scheme for choosing one database from the plurality of databases to store the received data, including:
      when n-th database is not full, writing the received data into the n-th database in real-time, wherein n is a positive integer;
      when the n-th database is full and n+1<=N, writing the received data into (n+1)-th database, and updating n to be equal to n+1, wherein N is an integer greater than 2; and
      when the n-th database is full and n+1>N, writing the received data into first database, overwriting the original data having a longer existence time period in the first database, and updating n to be equal to 1.

10. The method according to claim 9, further including:
    detecting data changes in one or more of the plurality of databases;
    creating new indices of the database with the data changes; and
    sending the indices to the searching service interface.

11. The method according to claim 9, further comprises:
    sending the indices for the regular database to the searching service interface to provide regular searching services,
    wherein:
    when the searching module receives a searching request, the searching module causes the index creation module to search the plurality of databases for real-time data;
    when the real-time data searching does not have desired results, the searching module causes the second index creation module to search the regular database.

12. The method according to claim 9, wherein:
    the maximum data capacity of an individual database from the plurality of databases is configured in such a way that the indices for the individual database is created in about one second by the data searching system.

* * * * *